(12) United States Patent
Li et al.

(10) Patent No.: US 10,607,133 B2
(45) Date of Patent: Mar. 31, 2020

(54) DIGITAL HUMAN GENERATION METHOD AND SYSTEM

(71) Applicant: Huawei Technologies Co., Ltd., Shenzhen (CN)

(72) Inventors: Yingtao Li, Shenzhen (CN); Li Qian, Shenzhen (CN); Maosheng Huang, Shenzhen (CN); Kangmin Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 544 days.

(21) Appl. No.: 14/660,493

(22) Filed: Mar. 17, 2015

(65) Prior Publication Data

US 2015/0262066 A1 Sep. 17, 2015

(30) Foreign Application Priority Data

Mar. 17, 2014 (CN) .......................... 2014 1 0099095

(51) Int. Cl.
*G06N 3/00* (2006.01)
(52) U.S. Cl.
CPC .................................. *G06N 3/006* (2013.01)
(58) Field of Classification Search
None
See application file for complete search history.

(56) References Cited

U.S. PATENT DOCUMENTS

| 8,554,876 | B2 | 10/2013 | Winsor |
| 2009/0011319 | A1 | 1/2009 | Joboji et al. |
| 2009/0113319 | A1* | 4/2009 | Dawson ............ G06F 17/30702 715/762 |
| 2011/0296324 | A1* | 12/2011 | Goossens ............... G06Q 10/10 715/763 |
| 2012/0204257 | A1 | 8/2012 | O'Connell et al. |

(Continued)

FOREIGN PATENT DOCUMENTS

| CN | 101901277 A | 12/2010 |
| CN | 102497404 A | 6/2012 |

(Continued)

OTHER PUBLICATIONS

Jung et al. "Development of a digital human model generation method for ergonomic design in virtual environment", International Journal of Industrial Ergonomics 39 (2009) pp. 744-748.*

(Continued)

*Primary Examiner* — Li Wu Chang
(74) *Attorney, Agent, or Firm* — Conley Rose, P.C.

(57) ABSTRACT

A digital human generation method and system, where the method includes: defining a digital human model, where the digital human model includes multiple dimensions of user profile models; acquiring multiple dimensions of data of a specific user that is from multiple data sources; and processing, based on the multiple dimensions of user profile models included in the digital human model, the multiple dimensions of data of the specific user that is from the multiple data sources, to generate multiple dimensions of user profiles corresponding to the specific user, where the multiple dimensions of user profiles of the specific user form a digital human corresponding to the specific user.

21 Claims, 4 Drawing Sheets

(56) References Cited

U.S. PATENT DOCUMENTS

| | | | |
|---|---|---|---|
| 2013/0185285 A1* | 7/2013 | Shuman | G06F 17/30554 707/722 |
| 2014/0280214 A1* | 9/2014 | Han | G06F 17/30943 707/748 |
| 2015/0113439 A1 | 4/2015 | Kimura et al. | |

FOREIGN PATENT DOCUMENTS

| | | |
|---|---|---|
| CN | 103116588 A | 5/2013 |
| CN | 103389981 A | 11/2013 |
| CN | 103393403 A | 11/2013 |
| CN | 103399883 A | 11/2013 |
| JP | 2014029667 A | 2/2014 |

OTHER PUBLICATIONS

Badler et al. "Animation Control for Real-Time Virtual Humans", Communications of the ACM, 1999, pp. 64-73.*

Partial English Translation and Abstract of Chinese Patent Application No. CN102497404A, Jun. 10, 2015, 9 pages.
Partial English Translation and Abstract of Chinese Patent Application No. CN103116588A, Jun. 10, 2015, 33 pages.
Partial English Translation and Abstract of Chinese Patent Application No. CN103393403A, Jun. 10, 2015, 10 pages.
Partial English Translation and Abstract of Chinese Patent Application No. CN101901277A, Jun. 5, 2015, 4 pages.
Foreign Communication From a Counterpart Application, PCT Application No. PCT/CN2015/073658, International Search Report dated Jun. 3, 2015, 7 pages.
Foreign Communication From a Counterpart Application, PCT Application No. PCT/CN2015/073658, Written Opinion dated Jun. 3, 2015, 5 pages.
Machine Translation and Abstract of Chinese Publication No. CN103399883, Nov. 20, 2013, 18 pages.
Foreign Communication From a Counterpart Application, Chinese Application No. 2014100990957, Chinese Search Report dated Oct. 19, 2017, 2 pages.
Foreign Communication From a Counterpart Application, Chinese Application No. 2014100990957, Chinese Office Action dated Nov. 1, 2017, 6 pages.

* cited by examiner

DIGITAL HUMAN GENERATION METHOD AND SYSTEM

CROSS-REFERENCE TO RELATED APPLICATION

This application claims priority to Chinese Patent Application No. 201410099095.7, filed on Mar. 17, 2014, which is hereby incorporated by reference in its entirety.

TECHNICAL FIELD

The present invention relates to the communications field, and in particular, to a digital human generation method and system in the communications field.

BACKGROUND

With continuous development of information and communications technology (ICT), human activities in the physical world increasingly penetrate a digital world. People make friends and establish circles of friends by using social networks; post personal opinions on social events by using Microblog to form We Media and build personal public images; obtain various goods and services through online shopping; participate in personal assets management by using network banks; record and share emotions by taking pictures or shooting videos anytime and anywhere by using personal mobile phone terminals; and sense their physical sign data by using wearable terminals to monitor their health. Further popularization of mobile terminals and the mobile Internet results in an explosive increase of data generated during activities of users on various data platforms, and massive data is distributed over digital life of users.

Behind such user data, there are various types of information representing features of individuals in the physical world, such as interests, hobbies, opinions, habits, families, and health. However, various dimensions of user data generated by various data sources is disperse and cannot be sufficiently mined.

SUMMARY

Embodiments of the present invention provide a digital human generation method and system, which can acquire multiple dimensions of data of a user that is from multiple data sources, mine the data, and generate a digital human.

According to a first aspect, a digital human generation method is provided, where the method includes: defining a digital human model, where the digital human model includes multiple dimensions of user profile models; acquiring multiple dimensions of data of a specific user that is from multiple data sources; and processing, based on the multiple dimensions of user profile models included in the digital human model, the multiple dimensions of data of the specific user that is from the multiple data sources, to generate multiple dimensions of user profiles corresponding to the specific user, where the multiple dimensions of user profiles of the specific user form a digital human corresponding to the specific user.

With reference to the first aspect, in a first possible implementation manner of the first aspect, the acquiring multiple dimensions of data of a specific user that is from multiple data sources includes: acquiring multiple dimensions of data of multiple users that is from multiple data sources; and determining, among the multiple dimensions of data of the multiple users that is from the multiple data sources and according to a belonging relationship between data and a user, the multiple dimensions of data belonging to the specific user that is from the multiple data sources.

With reference to the first possible implementation manner of the first aspect, in a second possible implementation manner of the first aspect, the acquiring multiple dimensions of data of multiple users that is from multiple data sources includes: acquiring the multiple dimensions of data of the multiple users that is from the multiple data sources by using at least one device of a terminal, a communications network element, and a data collection agent.

With reference to the first aspect or either of the first to second possible implementation manners of the first aspect, in a third possible implementation manner of the first aspect, the multiple dimensions of user profiles include at least two of the following: a user profile in an image dimension, a user profile in a health dimension, a user profile in a behavioral habit dimension, a user profile in a social pattern dimension, a user profile in a consumption habit dimension, and a user profile in an interest and hobby dimension.

With reference to the first aspect or any one of the first to third possible implementation manners of the first aspect, in a fourth possible implementation manner of the first aspect, the method further includes: performing data cleaning on the multiple dimensions of data of the specific user that is from the multiple data sources; extracting time and a keyword that are corresponding to content of cleaned data; and annotating the cleaned data by using the time and the keyword as annotation information, where the processing, based on the multiple dimensions of user profile models included in the digital human model, the multiple dimensions of data of the specific user that is from the multiple data sources, to generate multiple dimensions of user profiles corresponding to the specific user includes: processing annotated data based on the multiple dimensions of user profile models included in the digital human model, to generate the multiple dimensions of user profiles corresponding to the specific user.

With reference to the first aspect or any one of the first to third possible implementation manners of the first aspect, in a fifth possible implementation manner of the first aspect, the method further includes: performing data cleaning on the multiple dimensions of data of the specific user that is from the multiple data sources; extracting time, a location, and a keyword that are corresponding to content of cleaned data; and annotating the cleaned data by using the time, the location, and the keyword as annotation information, where the processing, based on the multiple dimensions of user profile models included in the digital human model, the multiple dimensions of data of the specific user that is from the multiple data sources, to generate multiple dimensions of user profiles corresponding to the specific user includes: processing annotated data based on the multiple dimensions of user profile models included in the digital human model, to generate the multiple dimensions of user profiles corresponding to the specific user.

With reference to the fourth possible implementation manner of the first aspect or the fifth possible implementation manner of the first aspect, in a sixth possible implementation manner of the first aspect, the method further includes storing the annotated data.

With reference to the first aspect or any one of the first to sixth possible implementation manners of the first aspect, in a seventh possible implementation manner of the first aspect, after the processing, based on the multiple dimensions of user profile models included in the digital human model, the multiple dimensions of data of the specific user that is from the multiple data sources, to generate multiple dimensions of user profiles corresponding to the specific user, the method further includes providing, according to a query condition input by a client, the client with a user profile of a digital human corresponding to the query condition.

With reference to the first aspect, or any one of the first to seventh possible implementation manners of the first aspect, in an eighth possible implementation manner of the first aspect, before the defining a digital human model, the method further includes creating, according to a requirement of the client, user profile models that are used to generate user profiles and corresponding to the requirement.

With reference to the first aspect or the first to eighth possible implementation manners of the first aspect, in a ninth possible implementation manner of the first aspect, the processing, based on the multiple dimensions of user profile models included in the digital human model, the multiple dimensions of data of the specific user that is from the multiple data sources, to generate multiple dimensions of user profiles corresponding to the specific user includes processing, based on the multiple dimensions of user profile models included in the digital human model, the multiple dimensions of data of the specific user that is from the multiple data sources by using at least one of the following algorithms, to generate the multiple dimensions of user profiles corresponding to the specific user: a classification algorithm, a clustering algorithm, a regression algorithm, a reinforcement learning algorithm, a transfer learning algorithm, a deep learning algorithm, and an active learning algorithm.

According to a second aspect, a digital human generation system is provided, where the system includes: a defining module configured to define a digital human model, where the digital human model includes multiple dimensions of user profile models; an acquiring module configured to acquire multiple dimensions of data of a specific user that is from multiple data sources; and a generating module configured to process, based on the multiple dimensions of user profile models included in the digital human model defined by the defining module, the multiple dimensions of data of the specific user that is from the multiple data sources and acquired by the acquiring module, to generate multiple dimensions of user profiles corresponding to the specific user, where the multiple dimensions of user profiles of the specific user form a digital human corresponding to the specific user.

With reference to the second aspect, in a first possible implementation manner of the second aspect, the acquiring module includes: an acquiring unit configured to acquire multiple dimensions of data of multiple users that is from multiple data sources; and a determining unit configured to determine, among the multiple dimensions of data of the multiple users that is from the multiple data sources and acquired by the acquiring unit, and according to a belonging relationship between data and a user, the multiple dimensions of data belonging to the specific user that is from the multiple data sources.

With reference to the first possible implementation manner of the second aspect, in a second possible implementation manner of the second aspect, the acquiring unit is specifically configured to acquire the multiple dimensions of data of the multiple users that is from the multiple data sources by using at least one device of a terminal, a communications network element, and a data collection agent.

With reference to the second aspect or either of the first to second possible implementation manners of the second aspect, in a third possible implementation manner of the second aspect, the multiple dimensions of user profiles include at least two of the following: a user profile in an image dimension, a user profile in a health dimension, a user profile in a behavioral habit dimension, a user profile in a social pattern dimension, a user profile in a consumption habit dimension, and a user profile in an interest and hobby dimension.

With reference to the second aspect or any one of the first to third possible implementation manners of the second aspect, in a fourth possible implementation manner of the second aspect, the system further includes: a cleaning module configured to perform data cleaning on the multiple dimensions of data of the specific user that is from the multiple data sources and acquired by the acquiring module; an extracting module configured to extract time and a keyword that are corresponding to content of data obtained by cleaning by the cleaning module; and an annotating module configured to annotate, by using the time and the keyword as annotation information, the data obtained by cleaning by the cleaning module, where the generating module is configured to process annotated data based on the multiple dimensions of user profile models included in the digital human model, to generate the multiple dimensions of user profiles corresponding to the specific user.

With reference to the second aspect or any one of the first to third possible implementation manners of the second aspect, in a fifth possible implementation manner of the second aspect, the system further includes: a cleaning module configured to perform data cleaning on the multiple dimensions of data of the specific user that is from the multiple data sources and acquired by the acquiring module; an extracting module configured to extract time, a location, and a keyword that are corresponding to content of data obtained by cleaning by the cleaning module; and an annotating module configured to annotate, by using the time, the location, and the keyword as annotation information, the data obtained by cleaning by the cleaning module, where the generating module is specifically configured to: process annotated data based on the multiple dimensions of user profile models included in the digital human model, to generate the multiple dimensions of user profiles corresponding to the specific user.

With reference to the fourth possible implementation manner of the second aspect or the fifth possible implementation manner of the second aspect, in a sixth possible implementation manner of the second aspect, the system further includes a storing module configured to store the annotated data of the annotating module.

With reference to the second aspect, or any one of the first to sixth possible implementation manners of the second aspect, in a seventh possible implementation manner of the second aspect, the system further includes a query module configured to provide, according to a query condition input by a client, the client with a user profile of a digital human corresponding to the query condition.

With reference to the second aspect, or any one of the first to seventh possible implementation manners of the second aspect, in an eighth possible implementation manner of the second aspect, the system further includes a creating module configured to create, according to a requirement of the client, user profile models that are used to generate user profiles and corresponding to the requirement.

With reference to the second aspect or any one of the first to eighth possible implementation manners of the second aspect, in a ninth possible implementation manner of the second aspect, the generating module is configured to process, based on the multiple dimensions of user profile models included in the digital human model, the multiple dimensions of data of the specific user that is from the multiple data sources by using at least one of the following algorithms, to generate the multiple dimensions of user profiles corresponding to the specific user: a classification algorithm, a clustering algorithm, a regression algorithm, a reinforcement learning algorithm, a transfer learning algorithm, a deep learning algorithm, and an active learning algorithm.

According to a third aspect, a digital human generation system is provided, where the system includes: a receiving module configured to receive multiple dimensions of data of multiple users that is from multiple data sources; a data pre-processing module configured to determine a user to which the data received by the receiving module belongs, and perform data cleaning and annotation on the data; a data storing module configured to store data pre-processed by the data pre-processing module; a user identity management module configured to manage accounts of the user in the multiple data sources, to determine a belonging relationship between data of multiple users that is stored in the storing module and a user; a user profile model configuration library configured to define user profile models for generating user profiles; an algorithm library configured to store and update multiple algorithms used to generate user profiles; a digital human generating and maintaining module configured to process, based on the user profile models in the user profile model configuration library and according to an algorithm in the algorithm library, the data stored in the storing module, to generate corresponding user profiles, where the user profiles form a digital human corresponding to the user; and a digital human application programming interface (API) configured to interact with a client, so that the client queries a user profile of a digital human that is generated by the digital human generating and maintaining module or accepts a requirement raised by the client to create a user profile model.

Based on the foregoing technical solutions and by using the digital human generation method and system according to the embodiments of the present invention, multiple dimensions of data of a user that is from multiple data sources is acquired, and the data is processed to generate, based on a digital human model, a digital human including multiple dimensions of user profiles.

BRIEF DESCRIPTION OF DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
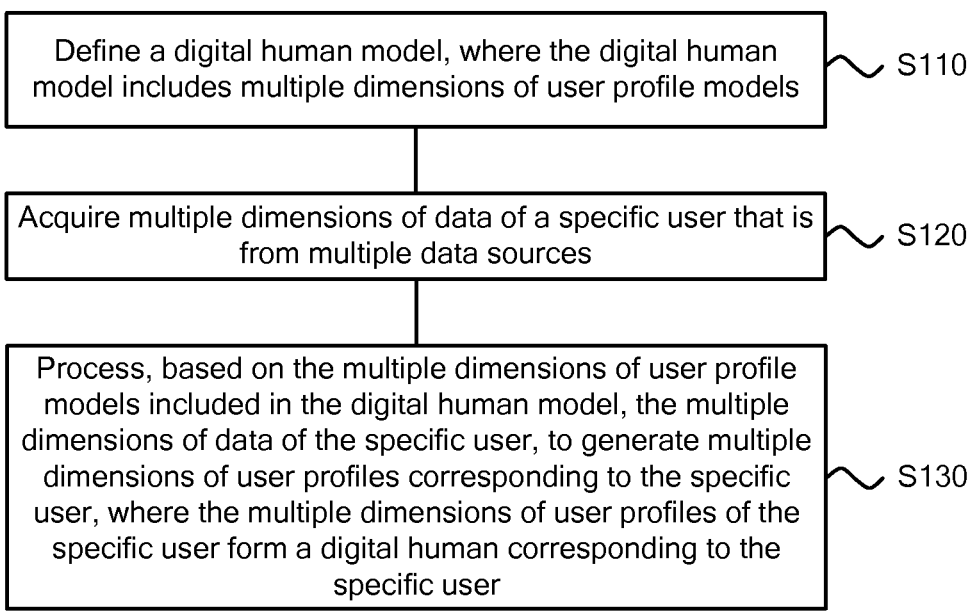
FIG. 1 is a schematic flowchart of a digital human generation method according to an embodiment of the present invention.

FIG. 1 shows a schematic flowchart of a digital human generation method 100 according to an embodiment of the present invention. The method 100 may be executed by a digital human generation system. As shown in FIG. 1, the method 100 includes:

S110: Define a digital human model, where the digital human model includes multiple dimensions of user profile models.

S120: Acquire multiple dimensions of data of a specific user that is from multiple data sources.

S130: Process, based on the multiple dimensions of user profile models included in the digital human model, the multiple dimensions of data of the specific user, to generate multiple dimensions of user profiles corresponding to the specific user, where the multiple dimensions of user profiles of the specific user form a digital human corresponding to the specific user.

Therefore, by using the digital human generation method according to this embodiment of the present invention, multiple dimensions of data of a user that is from multiple data sources is acquired, and the data is processed to generate, based on a digital human model, a digital human including multiple dimensions of user profiles.

It should be understood that, a user profile in one dimension is presentation of features of a user in the one dimension in the physical world, and is a virtual profile that is in the one dimension and obtained on a basis of profound understanding of real data. A digital human corresponding to a user in the physical world may be formed by combining multiple dimensions of user profiles, where the digital human may describe features of the user in the physical world from multiple dimensions. A user profile in one dimension is generated by mining data according to a user profile model in the corresponding dimension. The foregoing dimension may relate to an image, health, a behavioral habit, a social pattern, a consumption habit, an interest or hobby, or the like, or may further include multiple other dimensions corresponding to an individual in the physical world, to which this embodiment of the present invention is not merely limited.

In S110, a system defines a digital human model, where the digital human model includes multiple dimensions of user profile models. A user profile model in a dimension is used to represent a feature and a knowledge category of a user in the dimension, which are extracted from related collected data. A digital human model including multiple dimensions of user profile models defines, based on multiple dimensions of available data sources, a stereoscopic digital human from multiple different dimensions. In determining of different dimensions of user profile models included in a digital human model, at least the following elements should be taken into consideration: a usable data source, a feature type that can be obtained by mining, a primary requirement of a system, an updatable digital human feature requirement newly defined by a third-party customer, and the like.

The system may set a profile model configuration library to maintain multiple dimensions of user profile models included in a digital human model required for generating a digital human. These user profile models may be predefined and periodically updated, that is, added, deleted, or modified, by using the system. For example, a digital human model maintained on a platform may correspondingly define the following user profile models: a user profile model in an image dimension, a user profile model in a health dimension, a user profile model in a behavioral habit dimension, a user profile model in a social pattern dimension, a user profile model in a consumption habit dimension, a user profile model in an interest and hobby dimension, and the like, to which this embodiment of the present invention is not merely limited.

It should be understood that, the system may determine, according to user attributes, a digital human model including different user profile models for user groups with different attributes. In this embodiment of the present invention, a user attribute may be used to describe a user information type. Taking a user profession as an example, when user profile models are determined for a doctor group and a teacher group, in addition to user profile models that are common to all users, such as a user profile model in an image dimension and a user profile model in a health dimension, a user profile model for the doctor group may further include a user profile model in a dimension corresponding to an attribute that a profession of the doctor group is doctor, and a user profile model for the teacher group may further include a user profile model in a dimension corresponding to an attribute that a profession of the teacher group is teacher, to which this embodiment of the present invention is not limited.

Optionally, in an embodiment, a system may further create or modify a corresponding user profile model by receiving a customization requirement of a client. For example, the system may include a digital human API, to complete interaction between the system and a third-party client. When the client has a requirement on a user profile in a specific dimension, but there is no corresponding user profile model in a profile model configuration library in the current system, the client may feed the customization requirement back to the system through the API, so that the system creates a new user profile model. Correspondingly, the method 100 may further include creating, according to a requirement of a client, user profile models that are used to generate user profiles and corresponding to the requirement.

In S120, the multiple dimensions of data of the specific user that is from the multiple data sources are acquired. It should be understood that, by mining, data that is generated on various data platforms in a digital world by an individual in the physical world may provide an overall description of each dimension of feature corresponding to the individual in the physical world. Data of a user may be from multiple data sources, for example, may be from a mobile phone service platform, a real-time chat platform, such as QQ, WeChat, or Laiwang, a social platform, such as Microblog, a forum, or Renren, or a shopping platform, such as Taobao, Dangdang, or Jingdong; in addition, the data may further include data that is generated during communication of another user and related to the user, which is not limited in this embodiment of the present invention.

Data collected from multiple data sources may be in multiple dimensions, for example, an image dimension, a health dimension, a behavioral habit dimension, a social dimension, a consumption habit dimension, and an interest and hobby dimension of a user, which is not limited in this embodiment of the present invention.

The system may acquire the multiple dimensions of data of the multiple users that is from the multiple data sources by using at least one device of a terminal, a communications network element, and a data collection agent.

Optionally, in an embodiment, data of each user may be acquired by using a terminal. Information about an environment in which a user stays and information such as a user behavior may be collected and acquired by using a terminal, such as an intelligent terminal or a vehicle-mounted terminal, and various sensor apparatuses on the terminal, such as a global positioning system (GPS), a motion sensor, a light sensor, a microphone, and a camera. Track data of a user in a field may be acquired by using operating data and recorded application tracks of various application software operating on the terminal, such as social software, motion monitoring software, or health monitoring software. In addition, the terminal may further record various We Media content generated by the user, such as pictures, audio/video media, or text diaries. The terminal may report related data of the user to the digital human generation system periodically or at irregular intervals, or the digital human generation system may acquire related data of the user from the terminal periodically or at irregular intervals.

Optionally, in another embodiment, data of each user may be acquired by using a communications network element. For example, a communications network element, such as a radio network controller (RNC) or a home location register (HLR) includes a large amount of related data of the user that is generated during communication, and a digital human generation system may capture, from the communications network element, related data of multiple users.

Optionally, in another embodiment, data of multiple users may be acquired by using a data collection agent. The data collection agent captures comments, Internet surfing traces, and the like of a user on a network in a web crawling manner. For example, a record log of a user on a social network, an online shopping platform, a web search platform, a web service platform, or the like is captured. For another example, information related to the user and posted through various channels, such as social media content of a friend in a social circle of the user or information related to the user in a log, is captured. The data collection agent may report the captured content to the digital human generation system periodically or at irregular intervals, or the digital human generation system may acquire related data of the user from the data collection agent periodically or at irregular intervals.

Generally, user data with relatively intensive information and in a relatively small range may be acquired by using a terminal, and relatively dispersive user data may be acquired by using a communications network element or a data collection agent. In addition, user data may be acquired by another means or in another manner, which is not limited in this embodiment of the present invention.

It should be understood that, the system may acquire data by using its own device or module, or may receive data collected by a device or module outside the system through an interface, which is not limited in this embodiment of the present invention.

It should also be understood that, a large amount of data acquired from multiple data sources by using the foregoing method may belong to multiple users. In this case, to which user the data belongs needs to be determined. Correspondingly, in the method 100, the acquiring the multiple dimensions of data of the specific user from the multiple data sources includes: acquiring multiple dimensions of data of multiple users that is from multiple data sources; and determining, among the multiple dimensions of data of the multiple users that is from the multiple data sources and according to a belonging relationship between data and a user, the multiple dimensions of data belonging to the specific user that is from the multiple data sources.

After acquiring a large amount of data from the multiple data sources, the digital human generation system determines, according to a belonging relationship between data and a user corresponding to a digital human, the multiple dimensions of data belonging to the specific user. For example, information about a user corresponding to a digital human that exists in a system may be matched according to a source and content of data. When it is determined that a piece of data is related data of a user corresponding to a digital human that exists, the system may store or update the data to an account of the user corresponding to the digital human, or directly mine or analyze the data and store or update an obtained result to an account of the user corresponding to the digital human. When it is determined that a piece of data does not belong to a user corresponding to a digital human that exists, the system may recreate a user account to store the data or information that is obtained by mining the data.

Optionally, in an embodiment, to determine a belonging relationship between data and a user corresponding to a digital human, a system may record and maintain a correspondence between a user identification (ID) of the digital human and another identity ID of the user in the physical world. For example, a table may be maintained and updated in real time, where the table is used to record a user ID of the digital human and information about an individual in the physical world, such as a mobile phone number, WeChat account, QQ account, Microblog account, or forum account. According to the table, the system may conveniently identify a belonging relationship between data and a user, and may also conveniently query data of each user. For example, according to information recorded in the table, it may be identified that, if a user with a WeChat account "aaa111" and a user with a Microblog account "ccc222" are corresponding to a same user, data acquired from the WeChat account "aaa111" and data acquired from the Microblog account "ccc222" both belong to the same user. In addition, the belonging relationship between data and a user may be further determined according to content of data. For example, if a piece of data is a piece of news, and the news covers deeds related to the user, it may be determined that the news belongs to data of the user.

Figure 2:
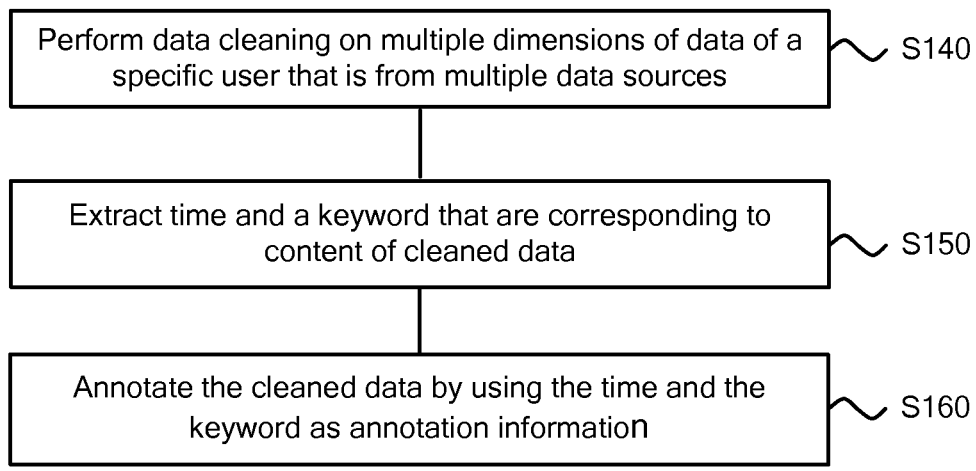
FIG. 2 is a schematic flowchart of a digital human generation method according to another embodiment of the present invention.

Optionally, in an embodiment, as shown in FIG. 2, the method 100 further includes:

S140: Perform data cleaning on the multiple dimensions of data of the specific user that is from the multiple data sources.

S150: Extract time and a keyword that are corresponding to content of cleaned data.

S160: Annotate the cleaned data by using the time and the keyword as annotation information.

The processing, based on the multiple dimensions of user profile models included in the digital human model, the multiple dimensions of data of the specific user, to generate multiple dimensions of user profiles corresponding to the specific user includes processing annotated data based on the multiple dimensions of user profile models included in the digital human model, to generate the multiple dimensions of user profiles corresponding to the specific user.

In S140, data cleaning is performed on the acquired multiple dimensions of data of the specific user that is from the multiple data sources to filter noisy data. Because the data may be from multiple data sources, the data may be heterogeneous. For example, the data may be structured data, semi-structured data, or unstructured data, that is, the user data may be a text or table, or may be a picture, audio, or video. For structured data, structures of data from different data sources may also be different. For example, in terms of shopping records, data from Taobao and data from Jingdong may have different structures. In this case, such data needs to be processed to make the data structures consistent, so that data is managed conveniently, and convergence is accelerated during subsequent mining operation.

The cleaned data may be a text or table, or may be a picture, audio, or video, which is difficult to manage and analyze. Optionally, in an embodiment, various cleaned heterogeneous data may be annotated. Specifically, time and a keyword that are corresponding to content included in the cleaned data may be extracted, and the cleaned data is annotated by using the time and the keyword as annotation information, so that a digital human is generated or information about a digital human is queried according to the annotation information. For example, for a picture about watching the raising of the national flag at Tian'anmen, annotation information of the picture may be that, the time is Jan. 1, 2014; and keywords are the raising of the national flag. The annotation information may further include location information corresponding to content included in the data, so that a location of the content included in the data is or a location at which an event occurs is conveniently identified. In addition, the annotation information may further include other information indicating data features, which is not limited in this embodiment of the present invention.

The annotated data can be conveniently managed and analyzed. When multiple dimensions of user profiles of the specific user are subsequently generated based on multiple dimensions of user profile models, the annotated data may be processed based on the multiple dimensions of user profile models, to generate the multiple dimensions of user profiles of the specific user.

Optionally, in an embodiment, the annotated data may be stored to facilitate subsequent management and generation and query of a digital human. Data storage and management may be implemented based on a Hadoop distributed platform, and because data stored and managed on a platform include various structured data, semi-structured data, and unstructured data, and storage and management of the data involves a possibility of dynamic addition or deletion, a non-relational database such as a NoSQL may be used to store and manage the data. Specifically, as shown in Table 1, data may be stored and managed by category according to user identities (IDs) corresponding to digital humans, and storage items may include a user ID to which data belongs, annotation information corresponding to data, a data file name, a storage location link of a data file, a data file type, and the like.

TABLE 1

| User ID | Annotation Information | Data File Name | Data File Location | Data File Type |
|---|---|---|---|---|
| First digital human | Time, location, and keyword | Picture | . . . | jpg |
| First digital human | Time, location, and keyword | Shopping record | . . . | xls |
| Second digital human | Time, location, and keyword | Medical examination report | . . . | doc |
| . . . | . . . | . . . | . . . | . . . |

In S130, the multiple dimensions of data of the specific user is processed based on the multiple dimensions of user profile models included in the digital human model, to generate the multiple dimensions of user profiles corresponding to the specific user, where the multiple dimensions of user profiles corresponding to the specific user form the digital human corresponding to the specific user. User profiles in corresponding dimensions may be generated based on the foregoing multiple dimensions of user profile models. The user profiles may include a user profile in an image dimension, a user profile in a health dimension, a user profile in a behavioral habit dimension, a user profile in a social pattern dimension, a user profile in a consumption habit dimension, a user profile in an interest and hobby dimension, and the like, to which this embodiment of the present invention is not merely limited. When multiple dimensions of data of a specific user is processed, a proper data mining algorithm may be called to mine and extract multiple dimensions of user profiles of the specific user. Optionally, in an embodiment, a data mining algorithm may include at least one of the following: a classification algorithm, a clustering algorithm, a regression algorithm, a reinforcement learning algorithm, a transfer learning algorithm, a deep learning algorithm, and an active learning algorithm, to which this embodiment of the present invention is not merely limited. The data mining algorithm may be configured in an algorithm library, which is defined and periodically maintained and updated by a system.

The following uses that a user profile in a consumption habit dimension is generated based on a user profile model in a consumption habit dimension as an example for description. For example, in an example of a user profile model in a consumption habit dimension, the model includes at least the following data items: a user ID, a preferred consumption brand of a user, an affordable consumption amount of a user, a frequent consumption time of a user, a frequent consumption place of a user, a preferred payment mode of a user, and the like.

The system collects, by using a terminal, a communications network element, a data collection agent, or the like, data related to consumption of a user. The data may be from a consumption record on a shopping platform, a consumption detail record of a credit card account, or the like. Table 2 shows a historical consumption record of a user, content of which includes a payment account, consumption time, a consumption place, a consumed brand, a consumption amount, a payment mode, and the like. Data of a user corresponding to a payment account, that is, a user corresponding to a user ID, is extracted, a corresponding data mining algorithm, such as a classification algorithm, a clustering algorithm, or a regression algorithm is called, and related statistical data of a user profile model in a consumption habit dimension may be obtained by analyzing historical consumption behavior records of a user that are shown in Table 2, to generate a user profile of the user in a consumption habit dimension.

For example, as shown in Table 2, a user with a payment account "payment account A" and a user with a payment account "payment account 1" are both corresponding to a user with a user ID "first digital human". A user profile of the user in a consumption habit dimension may be obtained through analysis by performing data mining on data of the foregoing payment accounts, that is, "payment account A" and "payment account 1", according to a user profile model in a consumption habit dimension. The user profile in a consumption habit dimension is that: the user ID is "first digital human", a preferred consumption brand is "sports & outdoor brand", an affordable consumption amount of the user is "2,000 to 5,000 RMB", frequent consumption time of the user is "rest days, such as a Saturday or Sunday", frequent consumption places of the user are "shopping malls in Haidian district of Beijing", and a preferred payment mode of the user is "credit card payment".

TABLE 2

| Payment Account | Consumed Brand | Consumption Amount | Consumption Time | Consumption Place | Payment Mode |
|---|---|---|---|---|---|
| Payment account A | Nike | 1299 | 20140104 | Zhongguancun, Beijing | Credit card |
| Payment account 1 | Columbia | 3499 | 20140105 | Wudaokou, Beijing | Credit card |
| Payment account A | Adidas | 1399 | 20140119 | Zhongguancun, Beijing | Credit card |
| Payment account 1 | North Face | 2499 | 20140125 | Wudaokou, Beijing | Credit card |
| . . . | . . . | . . . | . . . | . . . | . . . |

Multiple dimensions of user profiles of a specific user form a digital human corresponding to the specific user. A user profile in one dimension is presentation of features of a user in the one dimension in the physical world, and is a virtual profile that is in the one dimension and obtained on a basis of profound understanding of real data. According to a user profile model defined in a digital human model, multiple dimensions of user profiles may form a digital human corresponding to a user in the physical world, where the digital human may describe features of a user in the physical world from multiple dimensions. When newly acquiring data related to the specific user, the system may further update an existing user profile according to a user profile model. It should be understood that, the updating may be replacing the original user profile with a new user profile generated by using the newly acquired data, or may be retaining the original user profile, generating a new user profile, and describing features of the user in the dimension at different time stages by using the original user profile and the new user profile.

Optionally, in an embodiment, after a digital human is generated, the method 100 may further include providing, according to a query condition input by a client, the client with a user profile of a digital human corresponding to the query condition.

The client may query a user profile of a digital human for a specific user group through an API. For example, if a client inputs a mobile phone number or Microblog account of an individual in the physical world to serve as a retrieval condition, a user profile of a user corresponding to a digital human may be retrieved. For another example, if a health situation of "suffering from hypertension" is input, and a consumption capability is "relatively high consumption capability", all users who suffer from hypertension as indicated by a user profile in a health dimension and have a relatively high consumption capability as indicated by a user profile in a consumption habit dimension may be obtained by query, so that related medicine or therapeutic devices are recommended to these users. It should be understood that sequence numbers of the foregoing processes do not mean execution sequences in various embodiments of the present invention. The execution sequences of the processes should be determined according to functions and internal logic of the processes, and shall not be construed as any limitation on the implementation processes of the embodiments of the present invention.

Therefore, by using the digital human generation method according to this embodiment of the present invention, multiple dimensions of data of a user that is from multiple data sources is acquired, and the data is processed to generate, based on a digital human model, a digital human including multiple dimensions of user profiles.

Figure 3:
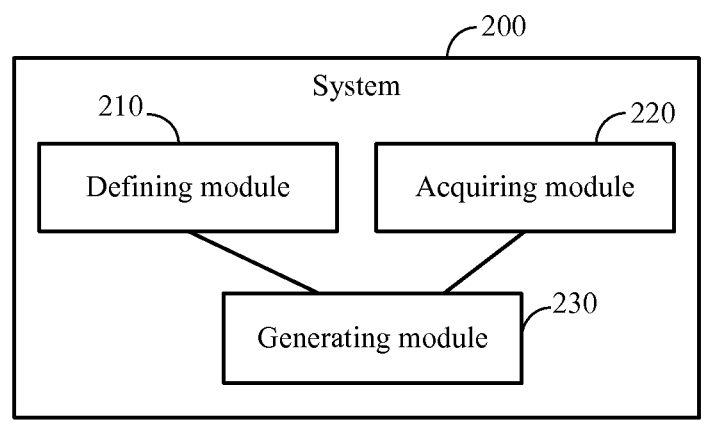
FIG. 3 is a schematic block diagram of a digital human generation system according to an embodiment of the present invention.
Figure 4:
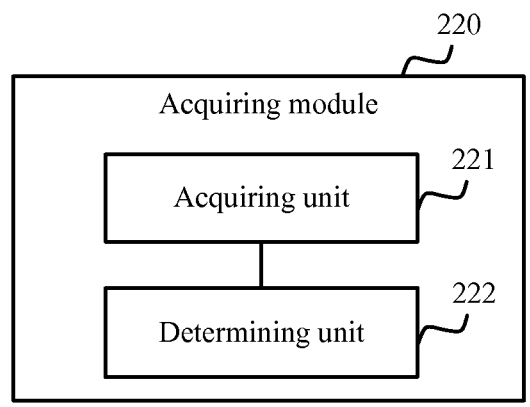
FIG. 4 is a schematic block diagram of an acquiring module according to an embodiment of the present invention.
Figure 5:
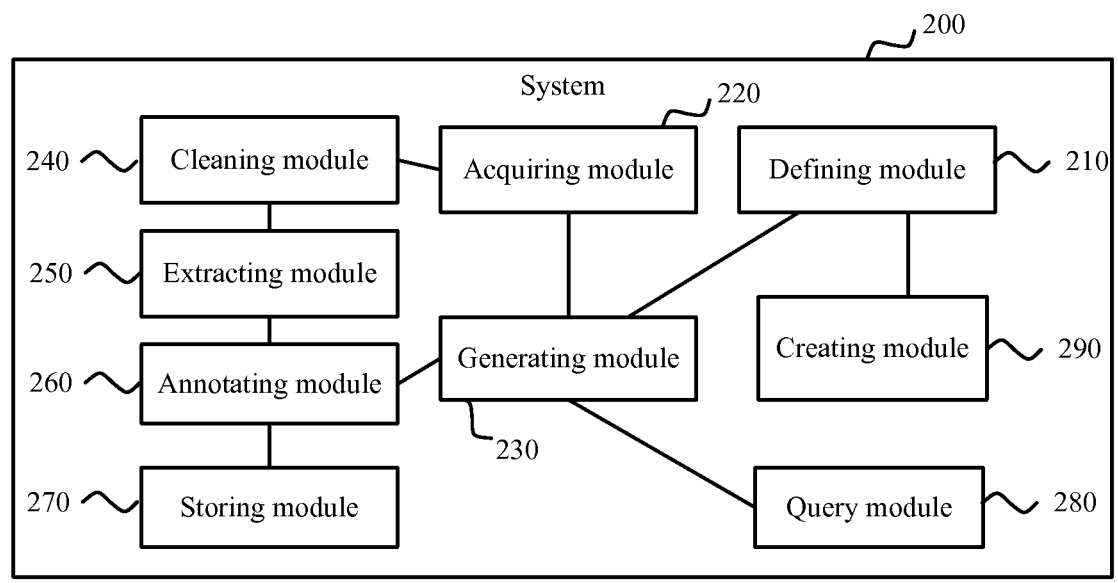
FIG. 5 is a schematic block diagram of a digital human generation system according to another embodiment of the present invention.

The foregoing describes in detail the digital human generation method according to this embodiment of the present invention with reference to FIG. 1 and FIG. 2, and the following describes in detail a digital human generation system according to an embodiment of the present invention with reference to FIG. 3 to FIG. 5.

FIG. 3 shows a schematic block diagram of a digital human generation system 200 according to an embodiment of the present invention. As shown in FIG. 3, the system 200 includes: a defining module 210 configured to define a digital human model, where the digital human model includes multiple dimensions of user profile models; an acquiring module 220 configured to acquire multiple dimensions of data of a specific user that is from multiple data sources; and a generating module 230 configured to process, based on the multiple dimensions of user profile models included in the digital human model defined by the defining module 210, the multiple dimensions of data of the specific user that is from the multiple data sources and acquired by the acquiring module 220, to generate multiple dimensions of user profiles corresponding to the specific user, where the multiple dimensions of user profiles of the specific user form a digital human corresponding to the specific user.

Therefore, by using the digital human generation system according to this embodiment of the present invention, multiple dimensions of data of a user that is from multiple data sources is acquired, and the data is processed to generate, based on a digital human model, a digital human including multiple dimensions of user profiles.

Optionally, in an embodiment, as shown in FIG. 4, the acquiring module 220 further includes: an acquiring unit 221 configured to acquire multiple dimensions of data of multiple users that is from multiple data sources; and a determining unit 222 configured to determine, among the multiple dimensions of data of the multiple users that is from the multiple data sources and acquired by the acquiring unit 221, and according to a belonging relationship between data and a user, the multiple dimensions of data belonging to the specific user that is from the multiple data sources.

Optionally, in an embodiment, the acquiring unit 221 is specifically configured to acquire the multiple dimensions of data of the multiple users that is from the multiple data sources by using at least one device of a terminal, a communications network element, and a data collection agent.

Optionally, in an embodiment, the multiple dimensions of user profiles include at least two of the following: a user profile in an image dimension, a user profile in a health dimension, a user profile in a behavioral habit dimension, a user profile in a social pattern dimension, a user profile in a consumption habit dimension, and a user profile in an interest and hobby dimension.

Optionally, in an embodiment, as shown in FIG. 5, the system 200 further includes: a cleaning module 240 configured to perform data cleaning on the multiple dimensions of data of the specific user that is from the multiple data sources and acquired by the acquiring module 220; an extracting module 250 configured to extract time and a keyword that are corresponding to content of data obtained by cleaning by the cleaning module 240; and an annotating module 260 configured to annotate, by using the time and the keyword as annotation information, the data obtained by cleaning by the cleaning module 240, where the determining unit 222 is specifically configured to process, based on the multiple dimensions of user profile models included in the digital human model determined by the determining module 210, data obtained by annotation by the annotating module 260, to generate the multiple dimensions of user profiles corresponding to the specific user.

Optionally, in an embodiment, as shown in FIG. 5, the system 200 further includes: a cleaning module 240 configured to perform data cleaning on the multiple dimensions of data of the specific user that is from the multiple data sources and acquired by the acquiring module 220; an extracting module 250 configured to extract time, a location, and a keyword that are corresponding to content of data obtained by cleaning by the cleaning module 240; and an annotating module 260 configured to annotate, by using the time, the location, and the keyword as annotation information, the data obtained by cleaning by the cleaning module 240.

The generating module 230 is specifically configured to process, based on the multiple dimensions of user profile models included in the digital human model determined by the determining module 210, data obtained by annotation by the annotating module 260, to generate the multiple dimensions of user profiles corresponding to the specific user.

Optionally, in an embodiment, as shown in FIG. 5, the system 200 further includes a storing module 270 configured to store the annotated data.

Optionally, in an embodiment, as shown in FIG. 5, the system 200 further includes a query module 280 configured to provide, according to a query condition input by a client, the client with a user profile of a digital human corresponding to the query condition.

Optionally, in an embodiment, as shown in FIG. 5, the system 200 further includes a creating module 290 configured to create, according to a requirement of the client, user profile models that are used to generate user profiles and corresponding to the requirement.

Optionally, in an embodiment, the generating module 230 is configured to process, based on the multiple dimensions of user profile models included in the digital human model determined by the determining module 210, the multiple dimensions of data of the specific user that is from the multiple data sources by using at least one of the following algorithms, to generate the multiple dimensions of user profiles corresponding to the specific user: a classification algorithm, a clustering algorithm, a regression algorithm, a reinforcement learning algorithm, a transfer learning algorithm, a deep learning algorithm, and an active learning algorithm.

It should be understood that, in this embodiment of the present invention, the digital human generation system 200 according to this embodiment of the present invention may be corresponding to an entity for executing the digital human generation method 100 according to the embodiment of the present invention, and the foregoing operations and/or functions and another operation and/or function of the modules in the system 200 are used to implement corresponding procedures in the method in FIG. 1 and FIG. 2. For brevity, details are not described herein again.

Therefore, by using the digital human generation system according to this embodiment of the present invention, multiple dimensions of data of a user that is from multiple data sources is acquired, and the data is processed to generate, based on a digital human model, a digital human including multiple dimensions of user profiles.

Figure 6:
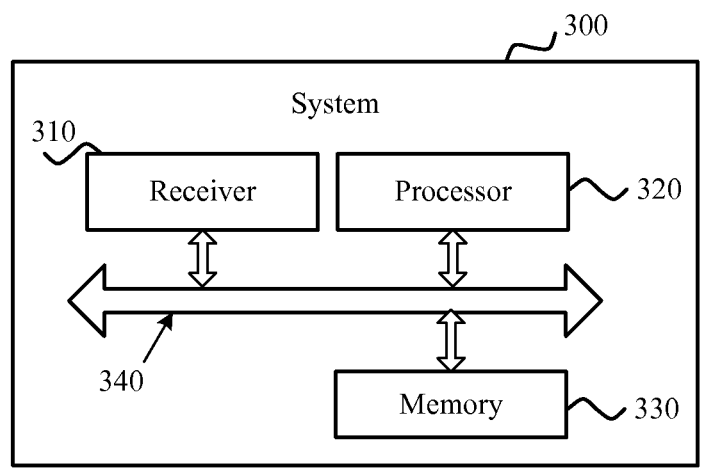
FIG. 6 is a schematic block diagram of a digital human generation system according to still another embodiment of the present invention.

As shown in FIG. 6, an embodiment of the present invention further provides a digital human generation system 300. The system 300 includes a receiver 310, a processor 320, a memory 330, and a bus system 340, where the receiver 310, the processor 320, and the memory 330 are connected by using the bus system 340. The memory 330 is configured to store an instruction, and the receiver 310 and the processor 320 are configured to execute the instruction stored in the memory 330. The receiver 310 is configured to acquire multiple dimensions of data of a specific user that is from multiple data sources.

The processor 320 is configured to: define a digital human model, where the digital human model includes multiple dimensions of user profile models; process, based on the multiple dimensions of user profile models included in the digital human model, the multiple dimensions of data of the specific user that is from the multiple data sources, to generate multiple dimensions of user profiles corresponding to the specific user, where the multiple dimensions of user profiles of the specific user form a digital human corresponding to the specific user.

Therefore, by using the digital human generation system according to this embodiment of the present invention, multiple dimensions of data of a user that is from multiple data sources is acquired, and the data is processed to generate, based on a digital human model, a digital human including multiple dimensions of user profiles.

It should be understood that, in this embodiment of the present invention, the processor 320 may be a central processing unit (CPU), or the processor 320 may be another general purpose processor, a digital signal processor (DSP), an application specific integrated circuit (ASIC), a field-programmable gate array (FPGA) or another programmable logic device, a discrete gate or transistor logic device, a discrete hardware assembly, or the like. A general purpose processor may be a microprocessor or the processor may also be any conventional processor or the like.

The memory 330 may include a read-only memory and a random access memory and provide the processor 320 with an instruction and data. A part of the memory 330 may further include a non-volatile random access memory. For example, the memory 330 may further store information about a storage device type.

In addition to a data bus, the bus system 340 may further include a power bus, a control bus, a status signal bus, and the like. However, for clear description, various types of buses in the figure are marked as the bus system 340.

During the implementation process, steps of the foregoing method may be completed by an integrated logic circuit of hardware or instructions in form of software in the processor 320. Steps of the method disclosed with reference to the embodiments of the present invention may be directly executed and accomplished by means of a hardware processor, or may be executed and accomplished by using a combination of hardware and software modules in the processor. The software module may be located in a mature storage medium in the art, such as a random access memory, a flash memory, a read-only memory, a programmable read-only memory, an electrically-erasable programmable memory or a register. The storage medium is located in the memory 330, and the processor 320 reads information in the memory 330 and completes the steps in the foregoing method with reference to hardware of the memory 330. To avoid repetition, details are not described in detail herein.

Optionally, in an embodiment, the receiver 310 may be configured to acquire multiple dimensions of data of multiple users that is from multiple data sources; and the processor 320 may be configured to determine, among the multiple dimensions of data of the multiple users that is from the multiple data sources and according to a belonging relationship between data and a user, the multiple dimensions of data belonging to the specific user that is from the multiple data sources.

Optionally, in an embodiment, the receiver 310 may acquire the multiple dimensions of data of the multiple users that is from the multiple data sources by using at least one device of a terminal, a communications network element, and a data collection agent.

Optionally, in an embodiment, the multiple dimensions of user profiles include at least two of the following: a user profile in an image dimension, a user profile in a health dimension, a user profile in a behavioral habit dimension, a user profile in a social pattern dimension, a user profile in a consumption habit dimension, and a user profile in an interest and hobby dimension.

Optionally, in an embodiment, the processor 320 may be further configured to: perform data cleaning on the multiple dimensions of data of the specific user that is from the multiple data sources and acquired by the receiver 310; extract time and a keyword that are corresponding to content of cleaned data; and annotate the cleaned data by using the time and the keyword as annotation information.

The processor 320 is further configured to process annotated data based on the multiple dimensions of user profile models included in the digital human model, to generate the multiple dimensions of user profiles corresponding to the specific user.

Optionally, in an embodiment, the processor 320 may be further configured to: perform data cleaning on the multiple dimensions of data of the specific user that is from the multiple data sources and acquired by the receiver 310; extract time, a location, and a keyword that are corresponding to content of cleaned data; and annotate the cleaned data by using the time, the location, and the keyword as annotation information.

The processor 320 is further specifically configured to process annotated data based on the multiple dimensions of user profile models included in the digital human model, to generate the multiple dimensions of user profiles corresponding to the specific user.

Optionally, in an embodiment, the memory 330 may be further configured to store the annotated data.

Optionally, in an embodiment, after the processor 320 generates a digital human, the processor 320 may be further configured to provide, according to a query condition input by a client, the client with a user profile of a digital human corresponding to the query condition.

Optionally, in an embodiment, before the processor 320 defines a digital human model, the processor 320 may be further configured to create, according to a requirement of a client, a user profile that is used to generate a user profile and corresponding to the requirement.

Optionally, in an embodiment, that the processor 320 generates a user profile may include processing, based on the multiple dimensions of user profile models included in the digital human model, the multiple dimensions of data of the specific user that is from the multiple data sources by using at least one of the following algorithms, to generate the multiple dimensions of user profiles corresponding to the specific user: a classification algorithm, a clustering algorithm, a regression algorithm, a reinforcement learning algorithm, a transfer learning algorithm, a deep learning algorithm, and an active learning algorithm.

It should be understood that, the digital human generation system 300 according to this embodiment of the present invention may be corresponding to an entity for executing the method in the embodiments of the present invention, or may be corresponding to the digital human generation system 200 according to the embodiments of the present invention, and the foregoing operations and/or functions and another operation and/or function of the modules in the system 300 are used to implement corresponding procedures in the method in FIG. 1 and FIG. 2. For brevity, details are not described herein again.

Therefore, by using the digital human generation system according to this embodiment of the present invention, multiple dimensions of data of a user that is from multiple data sources is acquired, and the data is processed to generate, based on a digital human model, a digital human including multiple dimensions of user profiles.

Figure 7:
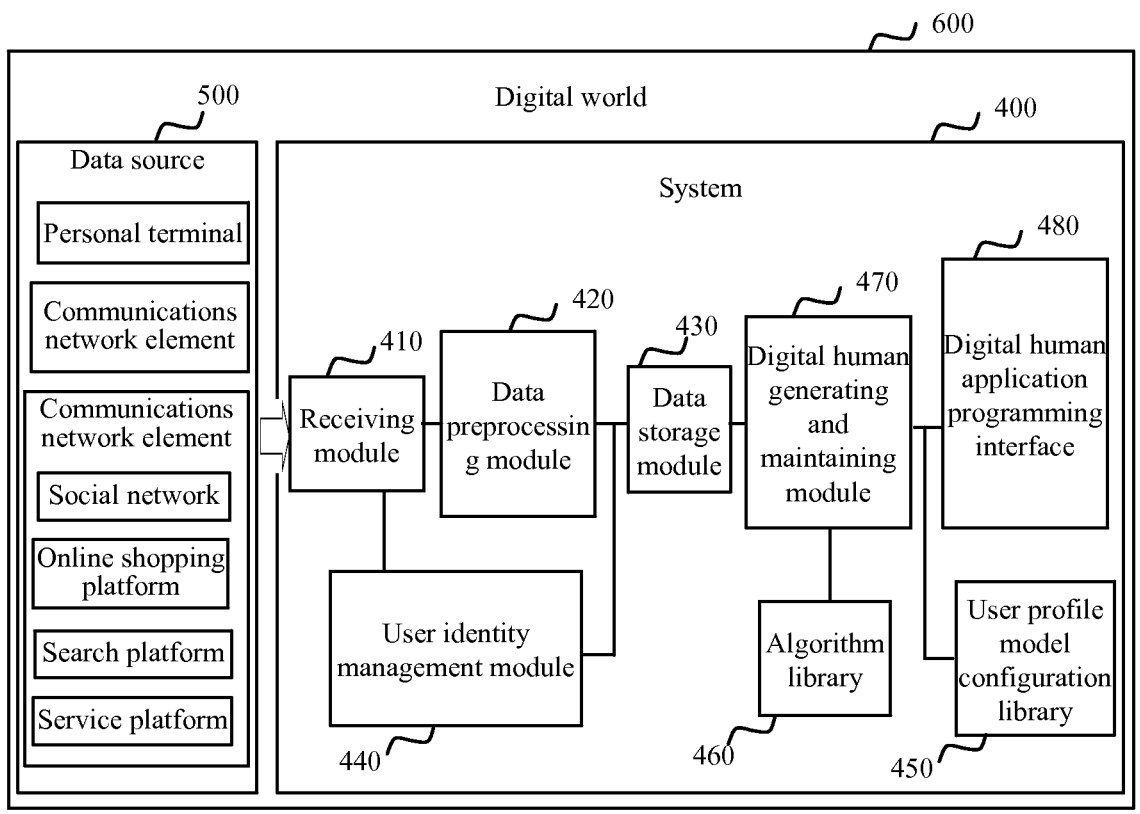
FIG. 7 is a schematic block diagram of a digital human generation system according to yet another embodiment of the present invention.

As shown in FIG. 7, an embodiment of the present invention further provides a digital human generation system 400. In this embodiment of the present invention, a digital world 600 includes multiple data sources 500, and the system 400 acquires data from the data sources 500 to generate a digital human, and interacts with the digital world 600 through an API. The system 400 includes: a receiving module 410 configured to receive multiple dimensions of data of multiple users that is from multiple data sources; a data preprocessing module 420 configured to determine a user to which the data received by the receiving module 410 belongs, and perform data cleaning and annotation on the data; a data storing module 430 configured to store data preprocessed by the data preprocessing module 420; a user identity management module 440 configured to manage accounts of the user in the multiple data sources, to determine a belonging relationship between data of multiple users that is stored in the data storing module 430 and a user; a user profile model configuration library 450 configured to define user profile models for generating user profiles; an algorithm library 460 configured to store and update multiple algorithms used to generate user profiles; a digital human generating and maintaining module 470 configured to process, based on the user profile models in the user profile model configuration library 450 and according to an algorithm in the algorithm library 460, the data stored in the storing module 430, to generate corresponding user profiles, where the user profiles form a digital human corresponding to the user; and a digital human API 480 configured to interact with a client, so that the client queries a user profile of a digital human that is generated by the digital human generating and maintaining module 470 or accepts a requirement raised by the client to create a user profile model.

It should be understood that, the digital human generation system 400 according to this embodiment of the present invention may be corresponding to an entity for executing the method in the embodiments of the present invention, or may be corresponding to the digital human generation system 200 and the digital human generation system 300 according to the embodiments of the present invention, and the foregoing operations and/or functions and another operation and/or function of the modules in the system 400 are used to implement corresponding procedures in the method in FIG. 1 and FIG. 2. For brevity, details are not described herein again.

Therefore, by using the digital human generation system according to this embodiment of the present invention, multiple dimensions of data of a user that is from multiple data sources is acquired, and the data is processed to generate, based on a digital human model, a digital human including multiple dimensions of user profiles; and user information, an algorithm library, and a user profile model may be updated and maintained, and the system may further interact with a third-party client.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A digital human generation method, comprising:
    defining, by a digital human system, a plurality of user profile models, wherein each of the plurality of user profile models comprises one or more pre-determined entries representing one of a plurality of dimensions of data;
    defining, by the digital human system, a digital human model comprising a data structure comprising one or more of the plurality of user profile models;
    collecting, by the digital human system, a data set comprising data from at least a subset of the plurality of dimensions of data by monitoring activities of a plurality of users;
    extracting a subset of data from the data set, wherein the subset of data is generated based upon activities of a specific user from the plurality of users;
    creating, by the digital human system, a plurality of user profiles for the specific user, wherein each of the plurality of user profiles comprises one of the plurality of user profile models populated with a portion of the subset of data, and wherein the portion of the subset of data is generated in one of the plurality of dimensions of data;
    creating, by the digital human system, a digital human describing features of the specific user, wherein the digital human comprises the digital human model populated with one or more of the plurality of user profiles for the specific user;
    providing, according to a query condition input by a client, the client with a user profile of the digital human corresponding to the query condition;
    acquiring additional data related to the specific user; and
    continuing to update the user profile of the digital human with the additional data related to the specific user based on a user profile model included in the user profile of the digital human, current content of the user profile of the digital human, and the additional data related to the specific user.

2. The digital human generation method of claim 1, wherein acquiring the data set comprises:
    acquiring the data set from a plurality of data sources; and
    determining the subset of data, based, at least in part, on a belonging relationship between the subset of data and the specific user.

3. The digital human generation method of claim 2, wherein acquiring the data set from a plurality of data sources comprises using at least one device of a terminal, a communications network element, or a data collection agent to access the plurality of data sources.

4. The digital human generation method of claim 1, wherein the plurality of user profiles comprises at least two of the following: a user profile in an image dimension, a user profile in a health dimension, a user profile in a behavioral habit dimension, a user profile in a social pattern dimension, a user profile in a consumption habit dimension, or a user profile in an interest and hobby dimension.

5. The digital human generation method of claim 1, further comprising:
    performing data cleaning on the subset of data;
    extracting a time and a keyword corresponding to content of cleaned data; and
    annotating the cleaned data using the time and the keyword as annotation information, wherein creating the plurality of user profiles comprises processing annotated data.

6. The digital human generation method of claim 1, further comprising:
    performing data cleaning on the data set;
    extracting a time, a location, and a keyword corresponding to content of cleaned data; and
    annotating the cleaned data using the time, the location, and the keyword as annotation information, wherein creating the plurality of user profiles comprises processing annotated data.

7. The digital human generation method of claim 5, further comprising storing the annotated data.

8. The digital human generation method of claim 1, further comprising monitoring activities of the plurality of users using one or more sensors.

9. The digital human generation method of claim 1, wherein before defining the digital human model, the method further comprises creating, based, at least in part, on a requirement of a client, one or more of the plurality of user profile models.

10. The digital human generation method of claim 1, wherein creating the plurality of user profiles comprises using at least one of the following algorithms: a classification algorithm, a clustering algorithm, a regression algorithm, a reinforcement learning algorithm, a transfer learning algorithm, a deep learning algorithm, or an active learning algorithm.

11. A digital human generation system, comprising:
a memory; and
a processor coupled to the memory, wherein the processor is configured to:
define a plurality of user profile models, wherein each of the plurality of user profile models comprises one or more pre-determined entries representing one of a plurality of dimensions of data;
define a digital human model comprising a data structure comprising one or more of the plurality of user profile models;
collect a data set comprising data from at least a subset of the plurality of dimensions of data by monitoring activities of a plurality of users;
extract a subset of data from the data set, wherein the subset of data is generated based upon activities of a specific user from the plurality of users;
create a plurality of user profiles for the specific user, wherein each of the plurality of user profiles comprises one of the plurality of user profile models populate with a portion of the subset of data, and wherein the portion of the subset of data is generated in one of the plurality of dimensions of data;
create a digital human describing features of the specific user, wherein the digital human comprising the digital human model populated with one or more of the plurality of user profiles for the specific user;
provide, according to a query condition input by a client, the client with a user profile of the digital human corresponding to the query condition;
acquire additional data related to the specific user; and
continue to update the user profile of the digital human with the additional data related to the specific user based on a user profile model included in the user profile of the digital human, current content of the user profile of the digital human, and the additional data related to the specific user.

12. The digital human generation system of claim 11, wherein the processor is further configured to:
acquire the data set from a plurality of data sources; and
determine the subset of data, based, at least in part, on a belonging relationship between the subset of data and the specific user.

13. The digital human generation system of claim 12, wherein the processor is further configured to interact with at least one device of a terminal, a communications network element, or a data collection agent to access the plurality of data sources.

14. The digital human generation system of claim 11, wherein the plurality of user profiles comprises at least two of the following: a user profile in an image dimension, a user profile in a health dimension, a user profile in a behavioral habit dimension, a user profile in a social pattern dimension, a user profile in a consumption habit dimension, or a user profile in an interest and hobby dimension.

15. The digital human generation system of claim 11, wherein the processor is further configured to:
perform data cleaning on the subset of data;
extract a time and a keyword corresponding to content of cleaned data; and
annotate, using the time and the keyword as annotation information, the cleaned data, wherein the processor configured to generate the plurality of user profiles comprises the processor configured to process annotated data.

16. The digital human generation system of claim 11, wherein the processor is further configured to:
perform data cleaning on the subset of data;
extract a time, a location, and a keyword corresponding to content of cleaned data; and
annotate, using the time, the location, and the keyword as annotation information, the cleaned data, wherein the processor configured to generate the plurality of user profiles comprises the processor configured to process annotated data.

17. The digital human generation system of claim 15, wherein the processor is further configured to store the annotated data.

18. The digital human generation system of claim 11, wherein the processor is further configured to monitor activities of a plurality of users using one or more sensors.

19. The digital human generation system of claim 11, wherein the processor is further configured to create, based, at least in part, on a requirement of a client, one or more of the plurality of user profile models.

20. The digital human generation system of claim 11, wherein the processor configured to create the plurality of user profiles comprises the processor using at least one of the following algorithms: a classification algorithm, a clustering algorithm, a regression algorithm, a reinforcement learning algorithm, a transfer learning algorithm, a deep learning algorithm, or an active learning algorithm.

21. The digital human generation method of claim 1, wherein the plurality of user profile models comprises a user profile in an image dimension, a user profile in a health dimension, a user profile in a behavioral habit dimension, a user profile in a social pattern dimension, a user profile in a consumption habit dimension, and a user profile in an interest and hobby dimension.

* * * * *